J. TANCZER.
GROUND CULTIVATOR.
APPLICATION FILED JUNE 18, 1913.
1,227,089.
Patented May 22, 1917.
2 SHEETS—SHEET 1.
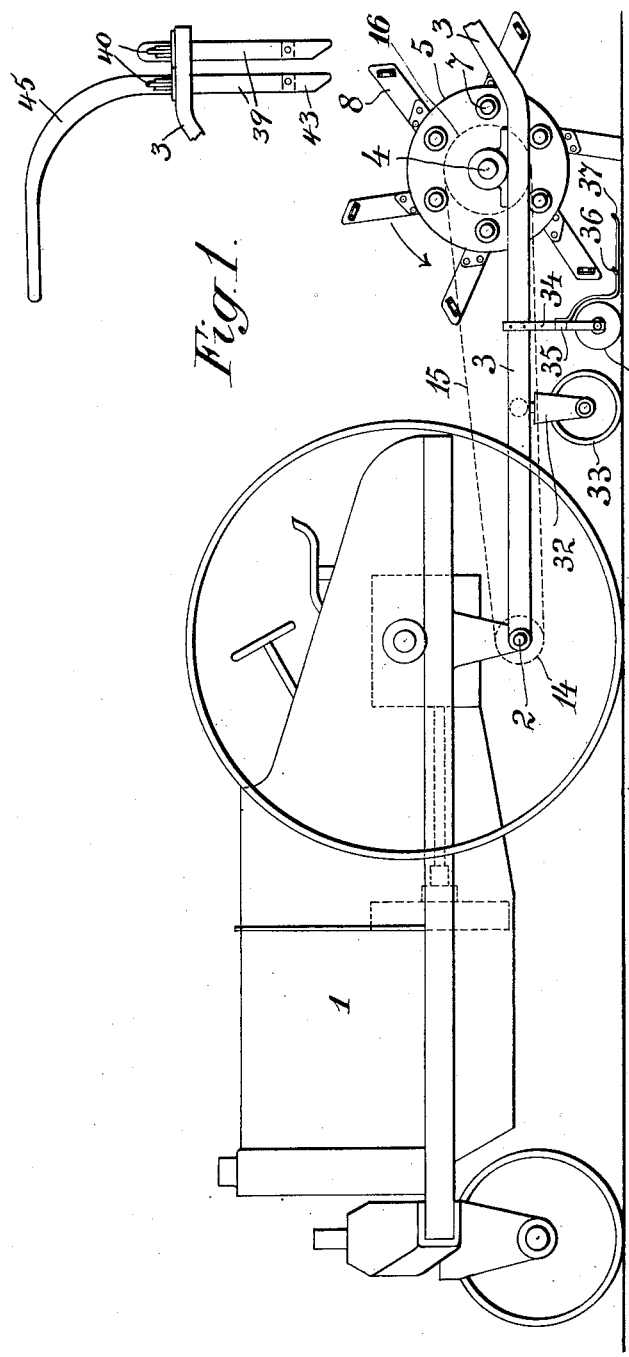
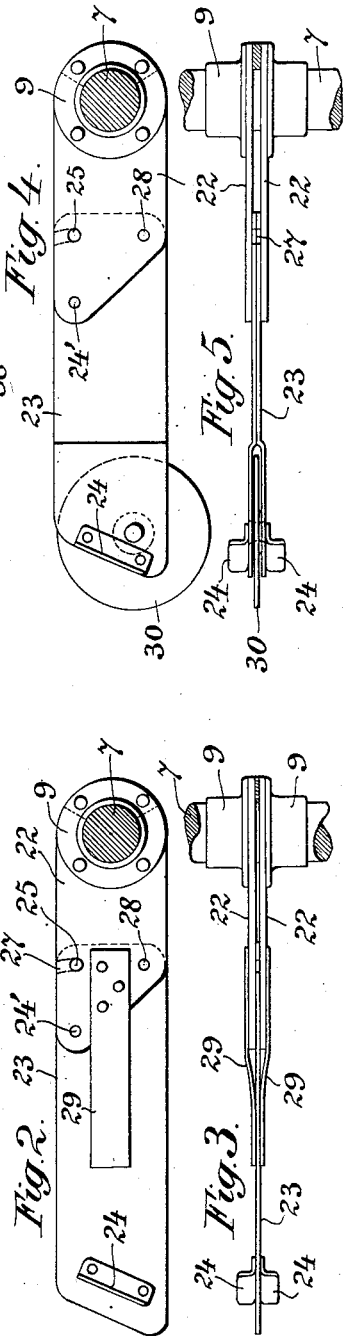

J. TANCZER.
GROUND CULTIVATOR.
APPLICATION FILED JUNE 18, 1913.
1,227,089.
Patented May 22, 1917.
2 SHEETS—SHEET 2.
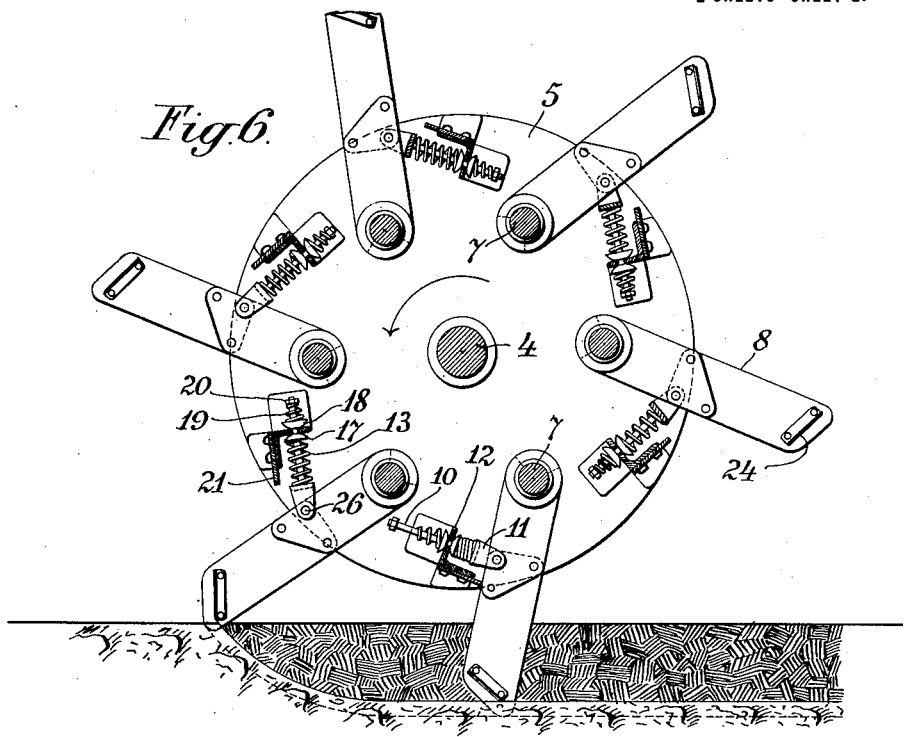
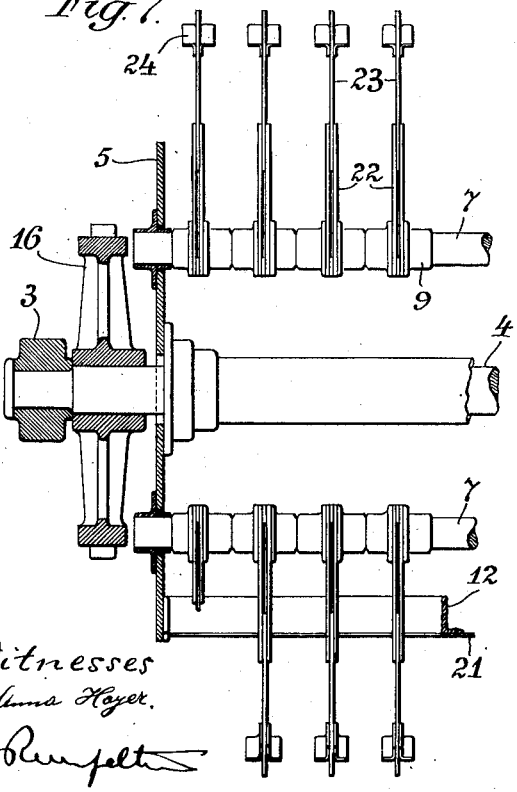
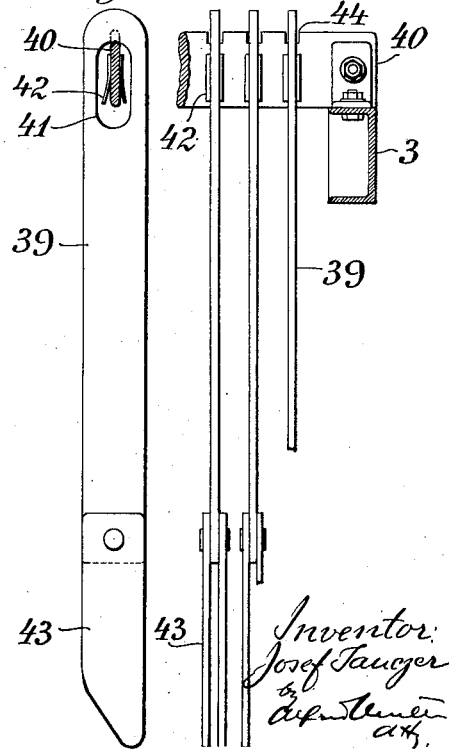

UNITED STATES PATENT OFFICE.

JOSEF TANCZER, OF BUDAPEST, HUNGARY.

GROUND-CULTIVATOR.

1,227,089.   Specification of Letters Patent.   Patented May 22, 1917.

Application filed June 18, 1913. Serial No. 774,297.

*To all whom it may concern:*

Be it known that I, JOSEF TANCZER, a subject of the King of Hungary, residing at 27 Alkotmány utca, Budapest V, Hungary, have invented certain new and useful Improvements in Ground-Cultivators, of which the following is a specification.

My invention relates to a ground-cultivator, which has mounted on a carriage-frame a drum provided with hoes in several rows and rotated mechanically in the direction of the travel. The stems of the hoes are mounted rotatable on axles lying parallel to the axle of the drum.

Machines of this kind hitherto known have the disadvantage, that the hoes did not dig into the ground, if the same had a capacity of resistance, but moved over the ground without cultivating the latter, in which case the hoes at best made grooves of small depths.

My invention has for its object to obviate this disadvantage, that is to cause the hoes to be forcibly driven into the ground. This is attained according to my invention by an arrangement, whereby the swinging of the stem of the hoes, caused by their digging into the ground, is restricted due to stops, so that when the hoes strike the stops the hoes are arrested in their further swinging movement and, therefore are forced to dig into the ground.

The drawings show an example of my invention.

Figure 1 is a side view of my new ground cultivator with the rear end shown apart, Fig. 2 shows a hoe, Fig. 3 is a plan view thereof, Fig. 4 shows a modification of the hoe, Fig. 5 is a plan thereof, Fig. 6 is a cross-section through the hoe-drum, Fig. 7 a section of a part of the hoe-drum, at right angles to the section shown in Fig 6, Fig. 8 a side view of one of the bars of a grate arranged on the machine to catch the earth thrown up by the hoes, Fig. 9 a rear view of a portion of this grate.

Referring to the drawings, 1 denotes a motor-vehicle having mounted thereon two beams 3 pivoted to an axle 2.

The rear parts of the beams 3 are provided with bearings for a shaft 4 (Figs. 1, 6 and 7) having fixed on both its ends within the beams 3 disks 5, one on each end. Near the circumference of the disks 5 rods 7 are secured therein in such a manner, that the two disks 5 are united by these rods 7 to form a drum. This drum, which carries the hoes for cultivating the ground, is adapted to rotate in the direction of the arrow shown in Figs. 1 and 6. The drum is rotated by the motor on the vehicle by means of a sprocket chain from a sprocket wheel 14 mounted on the axle 2. The rotation of the sprocket wheel 14 is transmitted to the drum by a chain 15 and a sprocket wheel 16 fast on the shaft 4. On each rod 7 of the hoe-drum is arranged a row of hoes 8, so that the hoes can swing around the rods 7, which may be referred to as the shafts of the hoes. The hoes have fixed thereon hubs 9 arranged suitably on both sides of the hoes so as to closely embrace the shafts 7 of the hoes, so that the latter have a secure bearing. The hoes 8 normally occupy a radial or approximately radial position (Figs. 1 and 6) and they are retained in this position by spring-bolts 10, which are pivotally connected with their forked ends 11 to the hoes. These spring-bolts 10 are guided in openings in the angle-irons 12, which are arranged adjacent each row of hoes and are secured near their ends to the disks 5.

These bolts are surrounded by strong springs 13 bearing with one end against the forks 11 and at the other end against washers 17 having the form of calottes. These washers have central bores, through which the bolts 10 loosely pass. The washers 17 are supported by the angle-irons 12. On the other side of each angle iron 12 the bolt 10 carries a washer 18 against which bears a buffer-spring 19. On the end of each spring-bolt 10 is screwed a nut 20 bearing against one end of the buffer-spring 19 and adapted to regulate the tension of both springs 13 and 19.

From this arrangement it will be seen, that the hoes 8 are normally maintained in their radial position, but can move away from the normal position, when the springs 13 are compressed.

To each angle-iron 12 is secured an adjustable or detachable stop plate 21, whereby the movement of the hoes is limited. This is a very important feature of my invention, because thereby the digging of the hoes into the ground in a forcible manner is assured. By the adjustable or detachable arrangement of the stop plates 21 the movement of the hoes may be regulated as desired. Where this adjustment is not required the stop plates 21 may be omitted, in which case the stops are formed by the angle-irons 12 themselves. As soon as a hoe passes out of the ground it will be moved again into its normal position by the spring 13. The buffer-springs 19 are provided to avoid shocks and to prevent the bolts from breaking as the hoes are rapidly returned to their normal position, the shock being elastically absorbed by the spring 19.

The mode of operation will be clear from the foregoing description.

If a hoe passes into the ground the hoe yields, the spring 13 being compressed, until the pressure of the spring overcomes the resistance of the ground. When the resistance of the ground is greater than the pressure of the spring, then the hoe moves back until it strikes against the stop 21 or the angle plate 12, whereby the hoe is forced to dig into the ground.

When the hoe encounters an excessively large resistance, for instance a large stone or the like, breakage of any part of the machine can be avoided by the well known arrangement of a breaking bolt of wood, as hereafter described.

In order to regulate the depth, to which the hoes pass into the soil a wide bearing roller 33 may be provided, the supporting fork 32 of which is adjustably attached to the beams 3.

The beams 3 have attached to them bars 34 in front of the hoe-drum, which bars 34 are connected with each other by a cross bar 35. To the latter are attached elastic teeth 36, 37 extending downwardly toward the ground. The shorter teeth 36 are arranged in the plane of the hoes whereas the longer teeth 37 extend in the spaces between two adjacent hoes. In the lower ends of the bars 34 is mounted a rotatable pressure-roller 38, for the purpose of pressing down the weeds standing on the ground. The elastic teeth 36, 37 are provided to prevent the weeds from rising up again the teeth holding the weeds down until they are gripped, cut and pressed into the ground by the hoes. The roller 38 may be mounted in a yielding manner so that the roll can adapt itself to irregularities of the ground. The roller also may press down dung strewed on the ground.

By the rapid rotation of the hoe-drum a part of the soil is thrown backward and upward. To avoid that larger pieces of soil should be thrown away, a grate may be arranged behind the hoe-drum, which grate catches the soil thrown back and up from the hoe-drum. This grate consists of flat bars 39 of iron (Figs. 1, 8 and 9), the bars being suspended from cross bars 40 in one or more rows, so that the bars 39 may be rocked around the cross bars 40. For this purpose the bars 39 are provided with openings 41 being a little wider than the cross bars 40, so that the bars 39 may be rocked within a limited range. The cross-bars 40 may be provided with leaf springs 42, against which the bars 39 strike during their swinging movement, so that the bars 39 will be pushed back by the springs 42, whereby the rocking movement of the bars 39 will be promoted. The rocking movement of the bars 39 has for its object to prevent the spaces between the bars 39 from being obstructed. The soil which is thrown against the grate consisting of the bars 39 is thrown back by the bars 39 and only the finely divided parts can pass through the spaces between the bars 39, which parts fall on the ground and cover the grooves formed by the machine. In this way the soil will be sifted through the grate.

The bars 39 of the grate may be formed of several parts also, connected movably to each other. As illustrated in the drawings the bars 39 of the grate have pivoted to their lower ends shorter parts 43. This arrangement has the advantage, that the parts 43 can yield backward when the grate strikes against the ground, without raising the grate or drum.

The bars of the grate are secured against lateral displacement, because the bars 39 are suspended in recesses 44 of the cross-bars 40. The grate-bars 39 of the first row are provided with extensions 45 extending over the hoe-drum, so that the soil thrown upward will also be thrown back. The two rows of grate-bars may be arranged in a staggered relation, so that the bars 39 of the second row hang opposite the spaces of the first row, whereby a finer sifting of the soil is secured, assuming that the bars 39 are arranged at equal distances apart from each other.

The hoes arranged on the machine above described may be constructed as desired. It is only material, that the hoe-stems, rotatably supported on the shafts 7, shall be rigid in the direction of the movement of the hoes.

The hoes, as illustrated in the drawings by way of example, consist each of two plates 22 attached to the rings 9 and supporting between them an elastic plate 23 of steel, rotatable around a bolt 24'. The elastic plate 23 of steel is provided on both sides of its forward end with proper hoe-tools 24. The plates 22 have a bore 25, through which passes the pivot-bolt 26 of the fork 11 of the spring-bolt 10 (Fig. 6). The steel-plate 23 has at this place a curved slot 27 to permit a free swinging of the steel-plate around the bolt 24'. The plates 22 and 23 have further a bore 28 through which may pass a so called breakage-bolt of wood, which breaks when the hoe encounters any excessive resistance, as above stated, whereby the swinging of the steel-plate 23 around the bolt 24' is permitted, so that the hoe will pass the resistance, without causing damage to the machine.

By making the plate 23 of steel the hoe may yield when lateral pressures occur in which case the hoe can yield between certain limits, without causing a permanent deformation of the stems of the hoes. The elasticity of the stems of the hoes may be increased by the use of separate leaf-springs 29 (Figs. 2 and 3), and this arrangement may also serve to make the stems somewhat more rigid against lateral bending, without interference with the elasticity of the stem. In the modification as illustrated in Figs. 4 and 5 the plate 23 is composed of two parts and has supported between its two parts a rotatable disk blade 30. The latter has for its object to facilitate the cutting into the ground, which cutting is performed in the modification above described by the steel-plate 23. By the use of the rotatable disk blade the resistance is lowered.

The hoe structure is not claimed herein, but forms the subject matter of a divisional application, Ser. No. 849,105, filed July 6, 1914.

Claims:

1. In ground cultivators, a rotatable hoe-drum, a plurality of hoes pivotally mounted on said drum and capable of swinging independent of each other about their pivots, springs for holding the hoes in their normal radial position and adapted to be compressed upon the hoes entering the ground and adjustable stops on the drum for limiting the backward movement of the hoes compressing their springs.

2. In ground cultivators, a rotatable hoe-drum, a plurality of hoes pivotally mounted on said drum and capable of swinging independent of each other about their pivots, bolts pivotally connected with said hoes, guides fixed on said drum for said bolts and springs surrounding said bolts and adapted to be compressed upon a backward movement of the hoes when entering the ground.

3. In ground cultivators, a rotatable hoe-drum, a plurality of hoes pivotally mounted on said drum and capable of swinging independent of each other about their pivots, bars arranged on said drum and forming stops for limiting the backward movement of the said hoes when entering the ground, bolts pivotally connected to said hoes and guided in bores of said bars, springs surrounding said bolts for holding the hoes in their normal radial position and adapted to be compressed by the hoes when entering the ground.

4. In ground cultivators, a rotatable hoe-drum, a plurality of hoes pivotally mounted on said drum and capable of swinging independent of each other about their pivots, bolts pivotally connected with said hoes, guides arranged on said drum for said bolts and springs surrounding said bolts and adapted to be compressed upon a backward movement of the hoes when entering the ground and buffer-springs on said bolts for absorbing the shock upon the sudden return of the hoes to their normal position.

In testimony whereof I affix my signature in presence of two witnesses.

JOSEF TANCZER.

Witnesses:
 Fülö Plohön,
 Hugh Kemeny.